(12) United States Patent
Tsuda et al.

(10) Patent No.: US 12,467,572 B2
(45) Date of Patent: Nov. 11, 2025

(54) PIPE JOINT AND MANUFACTURING METHOD OF PIPE JOINT

(71) Applicant: DAIKIN INDUSTRIES, LTD., Osaka (JP)

(72) Inventors: Hayato Tsuda, Osaka (JP); Tadaharu Isaka, Osaka (JP); Yumi Zenke, Osaka (JP); Yukari Yamamoto, Osaka (JP); Yasuyuki Yamaguchi, Osaka (JP); Hiroyuki Hamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 42 days.

(21) Appl. No.: 18/453,690

(22) Filed: Aug. 22, 2023

(65) Prior Publication Data

US 2023/0392737 A1 Dec. 7, 2023

Related U.S. Application Data

(63) Continuation of application No. PCT/JP2022/007737, filed on Feb. 24, 2022.

(30) Foreign Application Priority Data

Feb. 26, 2021 (JP) ................................. 2021-031086

(51) Int. Cl.
*B29C 45/26* (2006.01)
*B29C 45/14* (2006.01)
(Continued)

(52) U.S. Cl.
CPC ...... *F16L 41/021* (2013.01); *B29C 45/14065* (2013.01); *B29C 45/261* (2013.01);
(Continued)

(58) Field of Classification Search
CPC ............ B29C 45/61; B29C 2045/1719; B29C 45/2707; B29C 45/14065
See application file for complete search history.

(56) References Cited

U.S. PATENT DOCUMENTS

| | | | |
|---|---|---|---|
| 3,635,926 A | 1/1972 | Gresham et al. | |
| 3,945,786 A | 3/1976 | Bishop | |

(Continued)

FOREIGN PATENT DOCUMENTS

| | | | |
|---|---|---|---|
| CN | 1599757 A | 3/2005 | |
| CN | 103946250 A | 7/2014 | |

(Continued)

OTHER PUBLICATIONS

Translation of the International Search Report issued Oct. 13, 2020 in International Application No. PCT/JP2020/032236.

(Continued)

*Primary Examiner* — Alison L Hindenlang
*Assistant Examiner* — Debjani Roy
(74) *Attorney, Agent, or Firm* — Sughrue Mion, PLLC

(57) ABSTRACT

Provided is a pipe joint including a cylindrical hollow, wherein the wall thickness of a part having the largest wall thickness of the pipe joint is 2 to 7 mm, the ratio of the length of the hollow in the axial direction (L) to the diameter of the hollow (D), (L/D), is 5 or less, the pipe joint contains a copolymer containing tetrafluoroethylene unit and a fluoro (alkyl vinyl ether) unit, the content of the fluoro(alkyl vinyl ether) unit of the copolymer is 2.8 to 6.0% by mass with respect to the whole of the monomer units, the melt flow rate at 372° C. of the copolymer is 4.0 g/10 min or higher and lower than 11.0 g/10 min, and the number of functional groups of the copolymer is 50 or less.

7 Claims, 1 Drawing Sheet

(51) Int. Cl.
  *B29C 45/72*      (2006.01)
  *B29D 23/00*      (2006.01)
  *C08F 214/26*     (2006.01)
  *F16L 41/02*      (2006.01)
  *B29C 45/17*      (2006.01)
  *B29C 45/36*      (2006.01)
  *B29K 27/18*      (2006.01)
  *B29K 105/00*     (2006.01)
  *B29L 23/00*      (2006.01)

(52) U.S. Cl.
  CPC ........ *B29C 45/7207* (2013.01); *B29D 23/001* (2013.01); *C08F 214/262* (2013.01); *B29C 2045/1719* (2013.01); *B29C 2045/363* (2013.01); *B29K 2027/18* (2013.01); *B29K 2105/0085* (2013.01); *B29K 2995/0077* (2013.01); *B29K 2995/0097* (2013.01); *B29L 2023/22* (2013.01); *C08F 2800/20* (2013.01)

(56) References Cited

U.S. PATENT DOCUMENTS

| | | | |
|---|---|---|---|
| 4,262,101 A | 4/1981 | Hartwimmer et al. | |
| 4,414,356 A | 11/1983 | Michel | |
| 4,510,300 A | 4/1985 | Levy | |
| 4,743,658 A | 5/1988 | Imbalzano et al. | |
| 4,902,444 A | 2/1990 | Kolouch | |
| 5,000,875 A | 3/1991 | Kolouch | |
| 5,656,392 A | 8/1997 | Sano et al. | |
| 5,767,198 A | 6/1998 | Shimizu et al. | |
| 5,851,693 A | 12/1998 | Sano et al. | |
| 6,069,215 A | 5/2000 | Araki et al. | |
| 6,096,795 A | 8/2000 | Abusleme et al. | |
| 6,689,833 B1 | 2/2004 | Bidstrup et al. | |
| 6,713,183 B2 | 3/2004 | Araki et al. | |
| 6,740,375 B1 | 5/2004 | Sagisaka et al. | |
| 6,774,196 B1 | 8/2004 | Taira et al. | |
| 11,826,975 B2 | 11/2023 | Imamura et al. | |
| 2002/0011692 A1 | 1/2002 | Lahijani | |
| 2002/0099143 A1 | 7/2002 | Namura | |
| 2003/0013791 A1 | 1/2003 | Blong et al. | |
| 2003/0109646 A1 | 6/2003 | Kubo et al. | |
| 2003/0114615 A1 | 6/2003 | Sumi et al. | |
| 2003/0190530 A1 | 10/2003 | Yang et al. | |
| 2003/0216531 A1 | 11/2003 | Aten et al. | |
| 2004/0072935 A1 | 4/2004 | Blong et al. | |
| 2004/0102572 A1 | 5/2004 | Kubo et al. | |
| 2004/0204536 A1 | 10/2004 | Miyatani et al. | |
| 2004/0260044 A1 | 12/2004 | Earnest, Jr. et al. | |
| 2005/0020792 A1 | 1/2005 | Aoyama et al. | |
| 2007/0112155 A1 | 5/2007 | Takase et al. | |
| 2007/0149734 A1 | 6/2007 | Sakakibara et al. | |
| 2007/0281166 A1 | 12/2007 | Nishio | |
| 2008/0038627 A1 | 2/2008 | Yamauchi et al. | |
| 2008/0114143 A1 | 5/2008 | Brothers et al. | |
| 2009/0038821 A1 | 2/2009 | Sato et al. | |
| 2009/0044965 A1 | 2/2009 | Kono et al. | |
| 2009/0176952 A1 | 7/2009 | Funaki et al. | |
| 2009/0246435 A1 | 10/2009 | Shimono et al. | |
| 2010/0063214 A1 | 3/2010 | Kasahara et al. | |
| 2010/0212929 A1 | 8/2010 | Ishii et al. | |
| 2010/0273047 A1 | 10/2010 | Kunoike et al. | |
| 2010/0314153 A1 | 12/2010 | Ishii et al. | |
| 2010/0314154 A1 | 12/2010 | Kitahara et al. | |
| 2011/0052970 A1 | 3/2011 | Kurata et al. | |
| 2011/0052977 A1 | 3/2011 | Kurata et al. | |
| 2011/0104562 A1 | 5/2011 | Byun et al. | |
| 2011/0203830 A1 | 8/2011 | Kono et al. | |
| 2011/0272173 A1 | 11/2011 | Shiotsuki et al. | |
| 2012/0035329 A1 | 2/2012 | Isogai et al. | |
| 2012/0094169 A1 | 4/2012 | Kim et al. | |
| 2013/0130100 A1 | 5/2013 | Kurata et al. | |
| 2014/0227533 A1 | 8/2014 | Murakami et al. | |
| 2014/0287177 A1 | 9/2014 | Suda et al. | |
| 2014/0378616 A1 | 12/2014 | Nakano et al. | |
| 2015/0041145 A1 | 2/2015 | Colaianna et al. | |
| 2015/0148481 A1 | 5/2015 | Brothers et al. | |
| 2015/0158988 A1 | 6/2015 | Sawaki et al. | |
| 2016/0006004 A1 | 1/2016 | Ogawa et al. | |
| 2016/0108159 A1 | 4/2016 | Sekiguchi et al. | |
| 2016/0272805 A1 | 9/2016 | Nakanishi et al. | |
| 2016/0319089 A1 | 11/2016 | Imamura et al. | |
| 2017/0008986 A1 | 1/2017 | Isaka et al. | |
| 2017/0025204 A1 | 1/2017 | Chapman et al. | |
| 2017/0214037 A1 | 7/2017 | Uematsu et al. | |
| 2017/0260344 A1 | 9/2017 | Imamura et al. | |
| 2018/0009204 A1 | 1/2018 | Higuchi et al. | |
| 2018/0036931 A1 | 2/2018 | Higuchi et al. | |
| 2018/0237566 A1 | 8/2018 | Aida et al. | |
| 2018/0265654 A1 | 9/2018 | Imamura et al. | |
| 2018/0283590 A1 | 10/2018 | Yokoyama et al. | |
| 2019/0134939 A1 | 5/2019 | Colaianna et al. | |
| 2019/0143628 A1 | 5/2019 | Colaianna et al. | |
| 2019/0177453 A1 | 6/2019 | Isaka et al. | |
| 2019/0193315 A1 | 6/2019 | Miyamoto et al. | |
| 2019/0375929 A1 | 12/2019 | Nishimura et al. | |
| 2020/0332037 A1 | 10/2020 | Isaka et al. | |
| 2021/0008827 A1 | 1/2021 | Colaianna et al. | |
| 2021/0008828 A1 | 1/2021 | Colaianna et al. | |
| 2021/0024769 A1 | 1/2021 | Imamura et al. | |
| 2021/0189031 A1 | 6/2021 | Hintzer et al. | |
| 2021/0269568 A1 | 9/2021 | Imamura et al. | |
| 2022/0001657 A1 | 1/2022 | Kikuchi et al. | |
| 2022/0033636 A1 | 2/2022 | Nishimura et al. | |
| 2022/0170573 A1 | 6/2022 | Imamura et al. | |
| 2022/0181689 A1 | 6/2022 | Isaka et al. | |
| 2022/0181698 A1 | 6/2022 | Isaka et al. | |
| 2022/0181729 A1 | 6/2022 | Isaka et al. | |
| 2022/0195088 A1 | 6/2022 | Imamura et al. | |
| 2022/0213996 A1 | 7/2022 | Imamura et al. | |
| 2022/0266485 A1 | 8/2022 | Tsuda et al. | |
| 2022/0278403 A1 | 9/2022 | Isaka et al. | |
| 2023/0227594 A1 | 7/2023 | Yamamoto et al. | |
| 2023/0235107 A1 | 7/2023 | Isaka et al. | |
| 2023/0235159 A1 | 7/2023 | Isaka et al. | |
| 2023/0235160 A1 | 7/2023 | Isaka et al. | |
| 2023/0238627 A1 | 7/2023 | Isaka et al. | |
| 2023/0238628 A1 | 7/2023 | Zenke et al. | |
| 2023/0238629 A1 | 7/2023 | Isaka et al. | |
| 2023/0272136 A1 | 8/2023 | Zenke et al. | |
| 2023/0295356 A1 | 9/2023 | Isaka et al. | |
| 2023/0383031 A1 | 11/2023 | Isaka et al. | |
| 2023/0383032 A1 | 11/2023 | Isaka et al. | |
| 2023/0383033 A1 | 11/2023 | Zenke et al. | |
| 2023/0383034 A1 | 11/2023 | Isaka et al. | |
| 2023/0390977 A1 | 12/2023 | Hamada et al. | |
| 2023/0390978 A1* | 12/2023 | Tsuda ........................ | C08J 5/18 |
| 2023/0390979 A1 | 12/2023 | Tsuda et al. | |
| 2023/0390980 A1 | 12/2023 | Tsuda et al. | |
| 2023/0390981 A1 | 12/2023 | Tsuda et al. | |
| 2023/0391909 A1 | 12/2023 | Isaka et al. | |
| 2023/0391910 A1 | 12/2023 | Isaka et al. | |
| 2023/0391911 A1 | 12/2023 | Isaka et al. | |
| 2023/0391912 A1 | 12/2023 | Isaka et al. | |
| 2023/0391917 A1 | 12/2023 | Isaka et al. | |
| 2023/0391920 A1 | 12/2023 | Isaka et al. | |
| 2023/0391927 A1 | 12/2023 | Isaka | |
| 2023/0391929 A1 | 12/2023 | Isaka et al. | |
| 2023/0391931 A1 | 12/2023 | Isaka et al. | |
| 2023/0391932 A1 | 12/2023 | Isaka et al. | |
| 2023/0391933 A1 | 12/2023 | Isaka et al. | |
| 2023/0392737 A1 | 12/2023 | Tsuda et al. | |
| 2023/0395282 A1 | 12/2023 | Isaka et al. | |
| 2023/0399431 A1 | 12/2023 | Isaka et al. | |
| 2023/0399432 A1 | 12/2023 | Isaka et al. | |
| 2023/0399438 A1 | 12/2023 | Isaka et al. | |
| 2023/0399441 A1 | 12/2023 | Isaka et al. | |
| 2023/0399443 A1 | 12/2023 | Isaka et al. | |
| 2023/0406975 A1 | 12/2023 | Isaka et al. | |
| 2023/0406976 A1 | 12/2023 | Isaka et al. | |
| 2023/0411751 A1 | 12/2023 | Tsuda et al. | |
| 2023/0415387 A1 | 12/2023 | Hamada et al. | |
| 2025/0002728 A1 | 1/2025 | Isaka et al. | |

(56) References Cited

U.S. PATENT DOCUMENTS

| | | | |
|---|---|---|---|
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Zenke et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003236875 * | 8/2003 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021055760 * | 4/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 1/2022 |

OTHER PUBLICATIONS

Translation of the International Search Report issued Oct. 13, 2020 in International Application No. PCT/JP2020/032237.

(56) References Cited

OTHER PUBLICATIONS

Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.

(56) References Cited

OTHER PUBLICATIONS

International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.

(56) References Cited

OTHER PUBLICATIONS

International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Feb. 10, 2025 for European Patent Application No. 22759283.9.
European Search Report issued Feb. 20, 2025 for European Patent Application No. 22759263.1.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).

\* cited by examiner

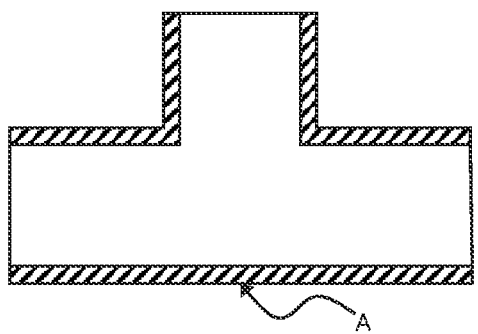
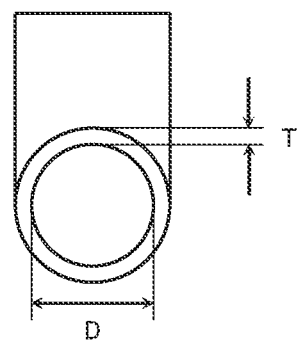
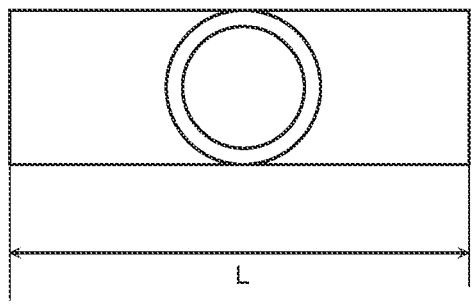

PIPE JOINT AND MANUFACTURING METHOD OF PIPE JOINT

CROSS-REFERENCE TO RELATED APPLICATIONS

This application is a Rule 53(b) Continuation of International Application No. PCT/JP2022/007737 filed Feb. 24, 2022, which claims priority based on Japanese Patent Application No. 2021-031086 filed Feb. 26, 2021, the respective disclosures of which are incorporated herein by reference in their entirety.

TECHNICAL FIELD

The present disclosure relates to a pipe joint and a method for producing a pipe joint.

BACKGROUND ART

Pipe joints formed from a tetrafluoroethylene/perfluoro (alkyl vinyl ether) copolymer have conventionally been known.

For example, Patent Document 1 describes that a joint for a semiconductor production apparatus is obtained by forming a molding material for an ozone-resistant article which is composed of a copolymer (A) and has a melt flow rate of 0.1 to 50 g/10 min, wherein the copolymer (A) is a copolymer composed of tetrafluoroethylene and perfluorovinyl ether, contains a perfluorovinyl ether unit in an amount of 3.5% by mass or higher, has a melting point of 295° C. or higher, and has not more than 50 unstable terminal groups per $1 \times 10^6$ carbon atoms in the copolymer (A).

RELATED ART

Patent Document

Patent Document 1: International Publication No. WO 2003/048214

SUMMARY

According to the present disclosure, there is provided a pipe joint comprising a cylindrical hollow, wherein the wall thickness of a part having the largest wall thickness of the pipe joint is 2 to 7 mm, the ratio of the length of the hollow in the axial direction (L) to the diameter of the hollow (D), (L/D), is 5 or less, the pipe joint contains a copolymer containing tetrafluoroethylene unit and a fluoro(alkyl vinyl ether) unit, the content of the fluoro(alkyl vinyl ether) unit of the copolymer is 2.8 to 6.0% by mass with respect to the whole of the monomer units, the melt flow rate at 372° C. of the copolymer is 4.0 g/10 min or higher and lower than 11.0 g/10 min, and the number of functional groups of the copolymer is 50 or less.

EFFECTS OF

According to the present disclosure, there can be provided a pipe joint which can be easily produced, is beautiful in both the hollow and the appearance, and is excellent in the deformation resistance to a high-temperature, high-pressure fluid, even when the wall thickness and the length are large.

BRIEF DESCRIPTION OF DRAWING

The FIGURE is a plan view, a cross-sectional view, and a side view of one embodiment of the pipe joint of the present disclosure.

DESCRIPTION OF EMBODIMENTS

Hereinafter, specific embodiments of the present disclosure will be described in detail, but the present disclosure is not limited to the following embodiments.

The pipe joint of the present disclosure comprises a cylindrical hollow, and the wall thickness of a part having the largest wall thickness of the pipe joint is 2 to 7 mm.

Such a pipe joint having a large wall thickness is usually produced by injection molding a copolymer using a core material for forming a hollow. When a pipe joint having a large wall thickness is produced by injection molding, forming defects such as sink marks and voids are likely to be caused, so that it is required to make the holding pressure (secondary pressure) high to suppress the forming defects. However, when the holding pressure is made high, there are problems in that a burr, which is another forming defect, is caused, smooth extraction of the core material is difficult, and the hollow (the inner surface of the pipe joint) is scratched. On the other hand, when it is intended to solve these problems, the extraction itself of the core material is difficult, and forming defects such as roughness and flow marks are caused.

When it is intended to enlarge both the wall thickness of the pipe joint and the length of the pipe joint, a further problem occurs. That is, when the length of the pipe joint (the length of the hollow of the pipe joint in the axial direction (L)) is enlarged, the length for extracting the core material is also enlarged and the core material is difficult to be extracted, so that the diameter of the pipe joint (the diameter of the hollow of the pipe joint (D) (the internal diameter of the pipe joint)) is required to be enlarged. When the diameter of the hollow of the pipe joint (D) is enlarged, the whole shape of the pipe joint is largely changed by the deformation of the pipe joint only in a small proportion.

Thus, a pipe joint is required that is beautiful in both the hollow and the appearance, is excellent in the deformation resistance to a high-temperature, high-pressure fluid, and is also excellent in the productivity due to that the core material can be smoothly extracted, even when the wall thickness and the length are large.

The pipe joint of the present disclosure has a cylindrical hollow, in which the wall thickness of a part having the largest wall thickness of the pipe joint is 2 to 7 mm, and the ratio of the length of the hollow in the axial direction (L) to the diameter of the hollow (D), (L/D), is 5 or less. Further, the pipe joint of the present disclosure contains a copolymer containing tetrafluoroethylene (TFE) unit and a fluoro(alkyl vinyl ether) (FAVE) unit, and the content of the FAVE unit, the melt flow rate (MFR) and the number of functional groups of the copolymer are suitably adjusted. Therefore, the pipe joint of the present disclosure can be easily produced, is beautiful in both the hollow and the appearance, and is excellent in the deformation resistance to a high-temperature, high-pressure fluid, even when the wall thickness and the length are large.

One embodiment of the pipe joint of the present disclosure is shown in the FIGURE. The pipe joint shown in the FIGURE is a T-type joint and has the wall thickness (T) and the diameter (D).

The wall thickness of a part having the largest wall thickness of the pipe joint is 2 to 7 mm, preferably 5 mm or smaller, and more preferably 3 mm or smaller. Due to having a relatively large wall thickness, the pipe joint of the present disclosure is excellent in the rigidity and the impact resistance.

Although the wall thickness is uniform in the pipe joint shown in the FIGURE, the thickness may be changed such that the wall thickness of a part having the largest wall thickness of the pipe joint is in the range of 2 to 7 mm. In one embodiment, the whole wall thickness of the pipe joint can be in the range of 2 to 7 mm. The whole wall thickness of the pipe joint is preferably 5 mm or smaller, and more preferably 3 mm or smaller.

The pipe joint shown in the FIGURE has two hollows having different axial directions, and the two hollows have different lengths in the axial direction. In the present disclosure, when the pipe joint has two or more hollows having different axial directions, the length of a hollow having the largest length in the axial direction is defined as "the length of the hollow of the pipe joint in the axial direction (L)".

The ratio of the length of the hollow of the pipe joint of the present disclosure in the axial direction (L) to the diameter of the hollow (D), (L/D), is 5 or less, preferably 4 or less, and more preferably 3 or less, and preferably 0.1 or more, and more preferably 1 or more. When the ratio (L/D) is large, the core material is hardly extracted during injection molding and it is difficult to produce pipe joints in a high productivity. Due to that the pipe joint of the present disclosure is excellent in the deformation resistance to a high-temperature, high-pressure fluid, the dimension hardly changes. Thus, even when a high-temperature, high-pressure fluid flows, the pipe joint of the present disclosure ensures to prevent the leakage of the fluid from the connection part of a piping and the pipe joint, despite of having a relatively large diameter (D) to the length (L).

The length of the hollow of the pipe joint of the present disclosure in the axial direction (L) is preferably 20 mm or larger, more preferably 25 mm or larger, still more preferably 30 mm or larger, especially preferably 35 mm or larger, and most preferably 40 mm or larger. The length of the hollow of the pipe joint of the present disclosure in the axial direction (L) is preferably 80 mm or smaller, more preferably 70 mm or smaller, still more preferably 60 mm or smaller, and especially preferably 50 mm or smaller. When the length of the pipe joint of the present disclosure is enlarged, the core material can be smoothly extracted during injection molding and the pipe joint of the present disclosure can be produced in a high productivity. Since the length of the pipe joint of the present disclosure is not largely limited, the degree of freedom in the design of the piping can be enhanced by using the pipe joint of the present disclosure.

The pipe joint of the present disclosure contains a copolymer containing tetrafluoroethylene (TFE) unit and a fluoro (alkyl vinyl ether) (PAVE) unit. The copolymer is a melt-fabricable fluororesin. Being melt-fabricable means that a polymer can be melted and processed by using a conventional processing device such as an extruder or an injection molding machine.

Examples of the FAVE constituting the above FAVE unit include at least one selected from the group consisting of a monomer represented by the general formula (1):

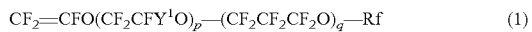  (1)

wherein $Y^1$ represents F or $CF_3$, and Rf represents a perfluoroalkyl group having 1 to 5 carbon atoms; p represents an integer of 0 to 5; and q represents an integer of 0 to 5, and a monomer represented by the general formula (2):

  (2)

wherein X is the same or different and represents H, F or $CF_3$; $R^1$ represents a linear or branched fluoroalkyl group having 1 to 6 carbon atoms which may contain one or two atoms of at least one selected from the group consisting of H, Cl, Br and I, or a cyclic fluoroalkyl group having 5 or 6 carbon atoms which may contain one or two atoms of at least one selected from the group consisting of H, Cl, Br and I.

Among them, the above FAVE is preferably the monomer represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the FAVE unit of the copolymer is 2.8 to 6.0% by mass with respect to the whole of the monomer units. The content of the FAVE unit of the copolymer is more preferably 3.0% by mass or higher, still more preferably 3.2% by mass or higher, further still more preferably 3.3% by mass or higher, especially preferably 3.4% by mass or higher, and most preferably 3.5% by mass or higher, and more preferably 5.8% by mass or lower, still more preferably 5.7% by mass or lower, further still more preferably 5.6% by mass or lower, and especially preferably 5.5% by mass or lower. When the content of the FAVE unit of the copolymer is too high, a burr is caused during injection molding, and the hollow (the inner surface of the pipe joint) is scratched during the extraction of the core material. When the content of the FAVE unit of the copolymer is too low, the extraction of the core material itself is difficult and excellent deformation resistance to a high-temperature, high-pressure fluid cannot be obtained.

The content of the TFE unit of the copolymer is, with respect to the whole of the monomer units, preferably 94.0 to 97.2% by mass, more preferably 94.2% by mass or higher, still more preferably 94.3% by mass or higher, further still more preferably 94.4% by mass or higher, and especially preferably 94.5% by mass or higher, and more preferably 97.0% by mass or lower, still more preferably 96.8% by mass or lower, further still more preferably 96.7% by mass or lower, especially preferably 96.6% by mass or lower, and most preferably 96.5% by mass or lower. When the content of the TFE unit of the copolymer is too low, a burr may be caused during injection molding, and the hollow (the inner surface of the pipe joint) may be scratched during the extraction of the core material. When the content of the TFE unit of the copolymer is too high, the extraction of the core material itself may be difficult, and excellent deformation resistance to a high-temperature, high-pressure fluid may not be obtained.

In the present disclosure, the content of each monomer unit in the copolymer is measured by a $^{19}$F-NMR method.

The copolymer can also contain a monomer unit originated from a monomer copolymerizable with TFE and FAVE. In this case, the content of the monomer unit copolymerizable with TFE and FAVE is, with respect to the whole of the monomer units of the copolymer, preferably 0 to 3.2% by mass, more preferably 0.05 to 1.0% by mass, and still more preferably 0.1 to 0.3% by mass.

The monomers copolymerizable with TFE and FAVE may include hexafluoropropylene (HFP), vinyl monomers represented by $CZ^1Z^2=CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2=CF-OCH_2-Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 4.0 g/10 min or higher and less than 11.0 g/10 min. The MFR of the copolymer is preferably 4.5 g/10 min or higher, and more preferably 5.0 g/10 min or higher, and preferably 10.5 g/10 min or lower, more preferably 10.0 g/10 min or lower, still more preferably 9.5 g/10 min or lower, and especially preferably 9.0 g/10 min or lower. When the MFR of the copolymer is too low, forming defects such as roughness and flow marks are caused. When the MFR of the copolymer is too high, a burr is caused and the hollow (the inner surface of the pipe joint) is scratched during the extraction of the core material. In addition, excellent deformation resistance to a high-temperature, high-pressure fluid cannot be obtained.

In the present disclosure, the number of functional groups per $10^6$ main-chain carbon atoms of the copolymer is 50 or less, preferably 40 or less, more preferably 30 or less, still more preferably 20 or less, further still more preferably 15 or less, especially preferably 10 or less, and most preferably less than 6. When the number of functional groups of the copolymer is too high, forming defects such as roughness and flow marks are caused and excellent deformation resistance to a high-temperature, high-pressure fluid cannot be obtained.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N=I\times K/t \quad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
| --- | --- | --- | --- | --- |
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

Absorption frequencies of —CH$_2$CF$_2$H, —CH$_2$COF, —CH$_2$COOH, —CH$_2$COOCH$_3$ and —CH$_2$CONH$_2$ are lower by a few tens of kaysers (cm$^{-1}$) than those of —CF$_2$H, —COF, —COOH free and —COOH bonded, —COOCH$_3$ and —CONH$_2$ shown in the Table, respectively.

For example, the number of the functional group —COF is the sum of the number of a functional group determined from an absorption peak having an absorption frequency of 1,883 cm$^{-1}$ derived from —CF$_2$COF and the number of a functional group determined from an absorption peak having an absorption frequency of 1,840 cm$^{-1}$ derived from —CH$_2$COF.

The functional groups are ones present on main chain terminals or side chain terminals of the copolymer, and ones present in the main chain or the side chains. The number of the functional groups may be the sum of the numbers of —CF=CF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer contained in the pipe joint of the present disclosure is preferably one which is subjected to the fluorination treatment. Further, the copolymer contained in the pipe joint of the present disclosure preferably has —CF$_3$ terminal groups.

The melting point of the copolymer is preferably 295 to 315° C., more preferably 300° C. or higher, still more preferably 301° C. or higher, and especially preferably 302° C. or higher, and more preferably 310° C. or lower, and still more preferably 305° C. or lower. Due to that the melting point is in the above range, the pipe joint can be further easily produced, both the hollow and the appearance of the pipe joint are further beautiful, and the pipe joint is further excellent in the deformation resistance to a high-temperature, high-pressure fluid, even when the wall thickness and the length of the pipe joint are large.

In the present disclosure, the melting point can be measured by using a differential scanning calorimeter [DSC].

The pipe joint of the present disclosure may contain other components such as fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

The copolymer contained in the pipe joint of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

dialkyl peroxycarbonates such as di-n-propyl peroxydicarbonate, diisopropyl peroxydicarbonate, di-sec-butyl peroxydicarbonate and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrododecafluoroheptanoyl-ω-hydrohexadecafluorononanoyl peroxide, ω-chloro-hexafluorobutyryl-ω-chlorodecafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known. The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF=CF$_2$ and —CONH$_2$, and thermally relatively stable functional groups thereof, such as —CF$_2$H, can be converted to thermally very stable —CF$_3$. Consequently, the total number (number of functional groups) of —COOH, —COOCH$_3$, —CH$_2$OH, —COF, —CF=CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

The pipe joint of the present disclosure can be produced by, for example, inserting a cylindrical core material into a cavity of a mold, filling the cavity of the mold with a molten copolymer from an injection molding machine, cooling the molten copolymer to solidify, extracting the core material along an axial direction of the pipe joint, and taking the pipe joint out from the mold.

Due to that the above production method is a method for injection molding a copolymer in which the content of the FAVE unit, the MFR and the number of functional groups are suitably adjusted, there can be produced a pipe joint which enables the core material to be smoothly extracted without scratching the hollow and in which forming defects such as roughness and flow marks are not observed, in a high productivity, even when the pipe joint having a large wall thickness and length is produced. In addition, the pipe joint (injection molded article) to be obtained is excellent in the deformation resistance to a high-temperature, high-pressure fluid.

In the above production method, a core material having the same length as the length of the hollow of the pipe joint in the axial direction (L) can be used. The core material may be one or a plurality of core materials. When a hollow having a large length in the axial direction (L) is formed, it is required to extract the core material having a large length during mold release. Due to that the above production method is a method for injection molding a copolymer in which the content of the FAVE unit, the MFR and the number of functional groups are suitably adjusted, the core material can be smoothly extracted without scratching the hollow.

Due to that the pipe joint of the present disclosure has a smooth hollow (the inner surface of the pipe joint) and is also excellent in the chemical resistance and the heat resistance, it can be suitably utilized as the piping for allowing a chemical solution to flow.

Although the embodiments have been described above, it will be understood that various changes in form and details are possible without departing from the gist and scope of the claims.

According to the present disclosure, there is provided a pipe joint comprising a cylindrical hollow, wherein the wall thickness of a part having the largest wall thickness of the pipe joint is 2 to 7 mm, the ratio of the length of the hollow in the axial direction (L) to the diameter of the hollow (D), (L/D), is 5 or less, the pipe joint contains a copolymer containing tetrafluoroethylene unit and a fluoro(alkyl vinyl ether) unit, the content of the fluoro(alkyl vinyl ether) unit of the copolymer is 2.8 to 6.0% by mass with respect to the whole of the monomer units, the melt flow rate at 372° C. of the copolymer is 4.0 g/10 min or higher and lower than 11.0 g/10 min, and the number of functional groups of the copolymer is 50 or less.

The length of the hollow in the axial direction (L) is preferably 20 mm or larger.

The fluoro(alkyl vinyl ether) unit of the copolymer is preferably perfluoro(propyl vinyl ether) unit.

The content of the fluoro(alkyl vinyl ether) unit of the copolymer is preferably 3.5 to 5.5% by mass with respect to the whole of the monomer units.

The melt flow rate at 372° C. of the copolymer is preferably 5.0 to 9.0 g/10 min.

The melting point of the copolymer is preferably 295 to 315° C.

The pipe joint of the present disclosure is preferably an injection molded article.

According to the method for producing a pipe joint of the present disclosure, there is provided a method for producing a pipe joint comprising inserting a cylindrical core material into a cavity of a mold, filling the cavity of the mold with a molten copolymer from an injection molding machine, cooling the molten copolymer to solidify, extracting the core material along the axial direction of the pipe joint, and taking the pipe joint out from the mold, wherein the ratio of the length of the hollow of the pipe joint formed by extracting the core material in the axial direction (L) to the diameter of the hollow (D), (L/D), is 5 or less, and the wall thickness of a part having the largest wall thickness of the pipe joint is 2 to 7 mm.

The length of the core material is preferably identical to the length of the hollow of the pipe joint in the axial direction (L).

EXAMPLES

Next, embodiments of the present disclosure will be described with reference to examples, but the present disclosure is not intended to be limited by these examples.

The numerical values of the Examples were measured by the following methods.

(Content of Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

(Number of Functional Groups)

Pellets of the copolymer was molded by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the sample was calculated according to the following formula (A).

$$N = I \times K / t \qquad (A)$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency (cm$^{-1}$) | Molar Extinction Coefficient (l/cm/mol) | Correction Factor | Model Compound |
| --- | --- | --- | --- | --- |
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |

TABLE 2-continued

| Functional Group | Absorption Frequency (cm$^{-1}$) | Molar Extinction Coefficient (l/cm/mol) | Correction Factor | Model Compound |
|---|---|---|---|---|
| —CONH$_2$ | 3436 | 506 | 460 | C$_7$H$_{15}$CONH$_2$ |
| —CH$_2$OH$_2$, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF=CF$_2$ | 1795 | 635 | 366 | CF$_2$=CF$_2$ |

Synthesis Example 1

51.8 L of pure water was charged in a 174 L-volume autoclave; nitrogen replacement was sufficiently carried out; thereafter, 40.9 kg of perfluorocyclobutane, 0.54 kg of perfluoro(propyl vinyl ether) (PPVE) and 5.10 kg of methanol were charged; and the temperature in the system was held at 35° C. and the stirring speed was held at 200 rpm. Then, tetrafluoroethylene (TFE) was introduced under pressure up to MPa, and thereafter 0.051 kg of a 50% methanol solution of di-n-propyl peroxydicarbonate was charged to initiate polymerization. Since the pressure in the system decreased along with the progress of the polymerization, TFE was continuously supplied to make the pressure constant, and 0.020 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 41.1 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, F$_2$ gas diluted to 20% by volume with N$_2$ gas was introduced to the atmospheric pressure. 0.5 hour after the F$_2$ gas introduction, vacuumizing was once carried out and the F$_2$ gas was again introduced. Further, 0.5 hour thereafter, vacuumizing was again carried out and F$_2$ gas was again introduced. Thereafter, while the above operation of the F$_2$ gas introduction and the vacuumizing was carried out once every 1 hour, the reaction was carried out at a temperature of 210° C. for 10 hours. After the reaction was finished, the reactor interior was replaced sufficiently by N$_2$ gas to finish the fluorination reaction. By using the fluorinated pellets, the above physical properties were measured by the methods described above.

Synthesis Example 2

Fluorinated pellets were obtained as in Synthesis Example 1, except for changing the charged amount of PPVE to 3.47 kg, changing the charged amount of methanol to 3.28 kg, changing the charged amount of the 50% methanol solution of di-n-propyl peroxydicarbonate to 0.026 kg, and adding 0.071 kg of PPVE for every 1 kg of TFE supplied, to thereby obtain 43.8 kg of a dry powder.

Synthesis Example 3

Fluorinated pellets were obtained as in Synthesis Example 1, except for changing the charged amount of PPVE to 2.69 kg, changing the charged amount of methanol to 0.10 kg, changing the charged amount of the 50% methanol solution of di-n-propyl peroxydicarbonate to 0.026 kg, and adding 0.057 kg of PPVE for every 1 kg of TFE supplied, to thereby obtain 43.2 kg of a dry powder.

Synthesis Example 4

Fluorinated pellets were obtained as in Synthesis Example 1, except for changing the charged amount of PPVE to 2.69 kg, changing the charged amount of methanol to 2.48 kg, and adding kg of PPVE for every 1 kg of TFE supplied, to thereby obtain 43.2 kg of a dry powder.

Synthesis Example 5

Non-fluorinated pellets were obtained as in Synthesis Example 1, except for changing the charged amount of PPVE to 2.75 kg, changing the charged amount of methanol to 0.88 kg, and adding 0.058 kg of PPVE for every 1 kg of TFE supplied, to thereby obtain 43.3 kg of a dry powder.

Synthesis Example 6

Fluorinated pellets were obtained as in Synthesis Example 1, except for changing the charged amount of PPVE to 1.49 kg, changing the charged amount of methanol to 1.65 kg, and adding kg of PPVE for every 1 kg of TFE supplied, to thereby obtain 42.4 kg of a dry powder.

Synthesis Example 7

Fluorinated pellets were obtained as in Synthesis Example 1, except for changing the charged amount of PPVE to 2.11 kg, changing the charged amount of methanol to 1.28 kg, adding 0.047 kg of PPVE for every 1 kg of TFE supplied, changing the raised temperature of the vacuum vibration-type reactor to 170° C., and changing the reaction condition to at 170° C. and for 5 hours, to thereby obtain 42.8 kg of a dry powder.

Synthesis Example 8

Fluorinated pellets were obtained as in Synthesis Example 1, except for changing the charged amount of PPVE to 2.75 kg, changing the charged amount of methanol to 0.60 kg, and adding 0.058 kg of PPVE for every 1 kg of TFE supplied, to thereby obtain 43.3 kg of a dry powder.

By using the pellets obtained in Synthesis Examples, the above physical properties were measured by the methods described above. The results are shown in Table 3.

TABLE 3

|  | PPVE content (% by mass) | MFR (g/10 min) | Melting point (° C.) | Number of functional groups (number/C10$^6$) |
|---|---|---|---|---|
| Synthesis Example 1 | 2.0 | 8.0 | 314 | <6 |
| Synthesis Example 2 | 6.6 | 9.0 | 298 | <6 |
| Synthesis Example 3 | 5.4 | 2.3 | 301 | <6 |
| Synthesis Example 4 | 5.4 | 15.0 | 302 | <6 |
| Synthesis Example 5 | 5.5 | 8.8 | 302 | 193 |
| Synthesis Example 6 | 3.5 | 5.0 | 307 | <6 |
| Synthesis Example 7 | 4.5 | 7.0 | 303 | 28 |
| Synthesis Example 8 | 5.5 | 9.0 | 302 | <6 |

The description of "<6" in Table 3 means that the number of functional groups is less than 6.

By using the pellets obtained as above, the pipe joint was prepared by the following method. The evaluation of the obtained pipe joint was carried out. The results are shown in Table 4.

(Preparation of Pipe Joint (1)) (Reference Example)

The pellets were injection molded by using an injection molding machine (SE50EV-A, manufactured by Sumitomo Heavy Industries, Ltd.) and setting the cylinder temperature to 400° C., the mold temperature to 220° C. and the injection speed to 5 mm/s, to thereby prepare a cylindrical injection molded article (1.5 cm in internal diameter Φ (the diameter of the hollow (D)=15 mm), 1.9 cm in outer diameter Φ, 2 mm in thickness, and 10.5 cm in length of the pipe in the axial direction (length in the axial direction (L)=105 mm)). A removable core material of 1.5 cm in diameter Φ and 10.5 cm in height is attached on the movable side mold.

The releasability was evaluated according to the following criteria.

Good: the cylindrical injection molded article was successfully extracted from the core material Poor: the cylindrical injection molded article was not successfully extracted from the core material Preparation of Pipe Joint (2)

The pellets were injection molded by using an injection molding machine (SE50EV-A, manufactured by Sumitomo Heavy Industries, Ltd.) and setting the cylinder temperature to 400° C., the mold temperature to 220° C. and the injection speed to 5 mm/s, to thereby prepare a cylindrical injection molded article (1.5 cm in internal diameter Φ (the diameter of the hollow (D)=15 mm), 1.9 cm in outer diameter Φ, 2 mm in thickness, and 4.5 cm in length of the pipe in the axial direction (length in the axial direction (L)=45 mm)). In the cavity, a removable core material of 1.5 cm in diameter Φ and 4.5 cm in height is attached to the movable side mold.

In the following evaluations, the pipe joint (2) was used.

(Evaluation of Appearance (Burr))

The end section of the hollow of the pipe joint (2) (the portion which is the interface of the core material and the mold) was visually observed and evaluated according to the following criteria.

Good: the burr was observed

Poor: the burr was not observed (Evaluation of Appearance (Hollow))

The hollow (the inner surface) of the pipe joint (2) was visually observed and evaluated according to the following criteria.

Good: no scratch was observed on the hollow

Poor: a scratch was observed on the hollow (Evaluation of Releasability)

Preparation of the pipe joint (2) was repeated 20 times according to the above method, and evaluations were made according to the following criteria.

Good: the core material was successfully extracted in all times of preparation

Poor: the core material was not successfully extracted in one or more times of preparation (Evaluation of Appearance (Gate Section))

The roughness of the inner wall on the periphery of a position in the joint corresponding to the gate section of the mold for the pipe joint (2) (position A shown in the FIGURE) was visually checked and evaluated by the following criteria.

Good: without surface roughness

Poor: with surface roughness (Evaluation of Appearance (Flow Mark))

The appearance of the pipe joint (2) was evaluated according to the following criteria.

Good: the entire surface was flat, and no flow marks were observed on the entire formed article Poor: roughness or flow marks were observed on the surface (Tensile Creep Test)

The tensile creep strain was measured by using TMA-7100 manufactured by Hitachi High-Tech Science Corporation. A sample of 1 mm in width and 20 mm in length was prepared from the pipe joint (2). The sample was mounted on measurement jigs with a 10 mm distance between jigs. A load was applied to the sample such that the load on the cross-section was 2.41 N/mm$^2$, the sample was allowed to stand at 240° C., and the displacement (mm) of the length of the sample from the time point 70 min after the start of the test until the time point 300 min after the start of the test was measured to thereby calculate the proportion (tensile creep strain (%)) of the displacement of the length (mm) to the length of the initial sample length (10 mm). An injection molded article having a small tensile creep strain (%) measured under the condition of 240° C. and 300 min hardly elongates even when a tensile load is applied in a remarkably high temperature environment and is excellent in the deformation resistance to a high-temperature, high-pressure fluid.

TABLE 4

| | Type of copolymer | Preparation of pipe joint (1) (Reference Example) | Pipe joint (2) | | | | | |
|---|---|---|---|---|---|---|---|---|
| | | | Evaluation of appearance (burr) | Evaluation of appearance (hollow) | Evaluation of releasability | Evaluation of appearance (gate section) | Evaluation of appearance (flow mark) | Tensile creep strain at 240° C. (%) |
| Comparative Example 1 | Synthesis Example 1 | — | Poor | Poor | Good | Good | Good | 1.26 |
| Comparative Example 2 | Synthesis Example 2 | — | Good | Good | Poor | Good | Good | 4.67 |
| Comparative Example 3 | Synthesis Example 3 | — | Good | Good | Good | Good | Poor | 2.09 |
| Comparative Example 4 | Synthesis Example 4 | — | Poor | Poor | Good | Good | Good | 3.77 |
| Comparative Example 5 | Synthesis Example 5 | — | Good | Good | Good | Poor | Poor | 4.08 |
| Experimental Example 1 | Synthesis Example 6 | Poor | Good | Good | Good | Good | Good | 1.67 |
| Experimental Example 2 | Synthesis Example 7 | Poor | Good | Good | Good | Good | Good | 2.41 |
| Experimental Example 3 | Synthesis Example 8 | Poor | Good | Good | Good | Good | Good | 3.41 |

When it is intended to prepare a pipe joint having a large wall thickness, forming defects such as sink marks and voids are likely to be caused. Thus, it is required to make the holding pressure (secondary pressure) during injection molding high to prepare a pipe joint having a large wall thickness. As shown in the results of Table 4, when the holding pressure during injection molding is made high, a burr may be caused, and the hollow (the inner surface of the pipe joint) may be scratched during the extraction of the core material (Comparative Examples 1 and 4). On the other hand, when it is intended to solve forming defects, the extraction itself of the core material is difficult (Comparative Example 2), and forming defects such as roughness and flow marks are caused (Comparative Examples 3 and 5).

When the ratio of the length of the hollow in the axial direction (L) to the diameter of the hollow (D) is too large, the extraction of the core material is difficult (Reference Example). Thus, to prepare a pipe joint having a large length of the hollow in the axial direction (L), it is required to enlarge the diameter of the hollow (D). When the diameter of the hollow of the pipe joint (D) is enlarged, the whole shape of the pipe joint is largely changed by the deformation of the pipe joint only in a small proportion, so that excellent deformation resistance to a high-temperature, high-pressure fluid is required. However, there is a problem in that conventional pipe joints do not necessarily have sufficient deformation resistance (Comparative Examples 2, 4, and 5).

In contrast, the pipe joint of the present disclosure enables the core material to be smoothly extracted in the production thereof, so that the production is easy (Experimental Examples 1 to 3). Further, the pipe joint of the present disclosure is beautiful in both the hollow and the appearance and has excellent deformation resistance to a high-temperature, high-pressure fluid, even when the wall thickness and the length are large (Experimental Examples 1 to 3).

The invention claimed is:

1. A pipe joint comprising a cylindrical hollow, wherein a wall thickness of a part having the largest wall thickness of the pipe joint is 2 to 7 mm,
a ratio of a length of the hollow in an axial direction (L) to a diameter of the hollow (D), (L/D), is 5 or less,
the pipe joint comprises a copolymer comprising tetrafluoroethylene unit and a fluoro(alkyl vinyl ether) unit,
a content of the fluoro(alkyl vinyl ether) unit of the copolymer is 2.8 to 6.0% by mass with respect to the whole of the monomer units, a melt flow rate at 372° C. of the copolymer is 4.0 g/10 min or higher and lower than 11.0 g/10 min, and the total number of —CF=CF$_2$, —CF$_2$H, —COF, —COOH, —COOCH$_3$, —CONH$_2$ and —CH$_2$OH of the copolymer is 50 or less.

2. The pipe joint according to claim 1, wherein the length of the hollow in the axial direction (L) is 20 mm or larger.

3. The pipe joint according to claim 1, wherein the fluoro(alkyl vinyl ether) unit of the copolymer is perfluoro (propyl vinyl ether) unit.

4. The pipe joint according to claim 1, wherein the content of the fluoro(alkyl vinyl ether) unit of the copolymer is 3.5 to 5.5% by mass with respect to the whole of the monomer units.

5. The pipe joint according to claim 1, wherein the melt flow rate at 372° C. of the copolymer is 5.0 to 9.0 g/10 min.

6. The pipe joint according to claim 1, wherein the melting point of the copolymer is 295 to 315° C.

7. The pipe joint according to claim 1, wherein the pipe joint is an injection molded article.

* * * * *